United States Patent
Nolan et al.

(10) Patent No.: US 7,669,186 B2
(45) Date of Patent: Feb. 23, 2010

(54) DEBUGGING APPLICATIONS AT RESOURCE CONSTRAINED VIRTUAL MACHINES USING DYNAMICALLY INSTALLABLE LIGHTWEIGHT AGENTS

(75) Inventors: John S. Nolan, Maybole (GB); Bernard Horan, Wivenhoe (GB)

(73) Assignee: Sun Microsystems, Inc., Santa Clara, CA (US)

(*) Notice: Subject to any disclaimer, the term of this patent is extended or adjusted under 35 U.S.C. 154(b) by 832 days.

(21) Appl. No.: 11/281,708

(22) Filed: Nov. 16, 2005

(65) Prior Publication Data

US 2007/0113218 A1    May 17, 2007

(51) Int. Cl.
G06F 9/44 (2006.01)
G06F 9/45 (2006.01)
(52) U.S. Cl. .................. 717/124; 717/127; 717/128
(58) Field of Classification Search ......... 717/124–130, 717/148
See application file for complete search history.

(56) References Cited

U.S. PATENT DOCUMENTS

| | | | |
|---|---|---|---|
| 5,655,121 A * | 8/1997 | Delagi et al. | 717/124 |
| 6,701,514 B1 * | 3/2004 | Haswell et al. | 717/115 |
| 6,832,367 B1 * | 12/2004 | Choi et al. | 717/130 |
| 6,848,097 B1 * | 1/2005 | Alverson et al. | 717/124 |
| 6,907,546 B1 * | 6/2005 | Haswell et al. | 714/38 |
| 6,957,422 B2 * | 10/2005 | Hunt | 717/130 |
| 6,961,925 B2 * | 11/2005 | Callahan et al. | 717/128 |
| 6,988,264 B2 * | 1/2006 | Sarma et al. | 717/128 |
| 7,178,131 B2 * | 2/2007 | Mitchell et al. | 717/124 |
| 7,359,831 B2 * | 4/2008 | Shrivastava et al. | 702/182 |
| 7,360,120 B2 * | 4/2008 | De Pauw et al. | 714/45 |
| 7,386,837 B2 * | 6/2008 | Creamer et al. | 717/127 |
| 7,493,387 B2 * | 2/2009 | Creamer et al. | 709/224 |
| 7,493,622 B2 * | 2/2009 | Borkan | 719/310 |
| 7,496,903 B2 * | 2/2009 | Rees et al. | 717/130 |
| 7,500,227 B1 * | 3/2009 | Fontana et al. | 717/127 |
| 7,516,443 B2 * | 4/2009 | Creamer et al. | 717/124 |

OTHER PUBLICATIONS

Gupta et al, "Using hardware transactional memory for data race detection", IEEE, pp. 1-11, 2009.*

Flanagan et al, "Fast track: Efficient and precise dynamic race detection", ACM PLDI, pp. 121-133, 2009.*

Serrano et al, "Scheme fair threads", ACM PPDP, pp. 203-214, 2004.*

Nagpurkar et al, "Efficient remote profiling for resources constrained devices", ACM Trans on Architecture and code optimization, vol. 3, No. 1, pp. 35-66, 2006.*

(Continued)

*Primary Examiner*—Anil Khatri
(74) *Attorney, Agent, or Firm*—Robert C. Kowert; Meyertons, Hood, Kivlin, Kowert & Goetzel, P.C.

(57) ABSTRACT

A system for debugging applications at resource-constrained virtual machines may include a target device configured to host a lightweight debug agent to obtain debug information from one or more threads of execution at a virtual machine executing at the target device, and a debug controller. The lightweight debug agent may include a plurality of independently deployable modules. The debug controller may be configured to select one or more of the modules for deployment at the virtual machine for a debug session initiated to debug a targeted thread, to deploy the selected modules at the virtual machine for the debug session, and to receive debug information related to the targeted thread from the lightweight debug agent during the session.

19 Claims, 8 Drawing Sheets

OTHER PUBLICATIONS

"Java™ Virtual Machine Debug Interface Reference", copyright 1996-2004, 69 pages, Sun Microsystems, Inc., printed from the internet: http://java.sun.com/j2se/1.4.2/docs/guide/jpda/jvmdi-spec.html.

"Java™ Debug Wire Protocol", copyright 2004, 7 pages, Sun Microsystems, Inc., printed from internet: http://java.sun.com/j2se/1.4.2/docs/guide/jpda/jdwp-spec.html.

"Java™ Platform Debugger Architecture", copyright 2004, 5 pages, Sun Microsystems, Inc., printed from the internet: http://java.sun.com/j2se/1.3/docs/guide/jpda/index.html.

Grzegorz Czajkowski, "Application Isolation in the Java™ Virtual Machine", Conference on Object Oriented Programming Systems Languages and Applications, 2000, pp. 354-366, Minneapolis, Minnesota, USA.

Antero Taivalsaari, Bill Bush and Doug Simon, "The Spotless System: Implementing a Java™ System for the Palm Connected Organizer" Feb. 2000, 18 pages, Sun Microsystems, Inc., Palo Alto, California, USA.

"J2ME Building Blocks for Mobile Devices", White Paper on KVM and the Connected, Limited Device Configuration (CLDC), May 19, 2000, 42 pages, printed from the internet: http://java.sun.com/products/cldc/wp/KVMwp.pdf.

"CLDC HotSpot™ Implementation Virtual Machine", White Paper, Feb. 2005, 24 pages, printed from the internet: http://java.sun.com/j2me/docs/pdf/CLDC-HI_whitepaper-February_2005.pdf.

"Using KVM Debug Wire Protocol to Debug MIDlets", Mar. 18, 2004, 4 pages, Motorola.

* cited by examiner

DEBUGGING APPLICATIONS AT RESOURCE CONSTRAINED VIRTUAL MACHINES USING DYNAMICALLY INSTALLABLE LIGHTWEIGHT AGENTS

BACKGROUND OF THE INVENTION

1. Field of the Invention

The present invention is directed to computer systems. More particularly, it is directed to debugging applications running at resource-constrained computer systems.

2. Description of the Related Art

As processor technology has advanced in recent years, more and more applications have been developed for devices with small physical footprints and limited memory and power capacity, such as mobile phones, personal digital assistants, pagers and the like. Initially, many of the applications for such small devices were written in platform-specific programming languages; as a result, many of these applications were not easily portable and did not gain widespread acceptance. However, the demand for small resource-constrained devices continues to rise, for applications as varied as communication, environmental monitoring, cashless financial transactions, inventory management, national security, and the like.

More recently, versions of platform-independent virtual machine environments (e.g., Java™ virtual machines or JVMs) have been developed for some limited-memory platforms such as "smart cards" and battery-powered transducers, so that applications developed in widely supported high-level languages such as Java™ may be deployed to devices with limited memory. In order to be able to deploy these applications to devices with as little as a few hundred total kilobytes of memory, executable application code may be pre-processed prior to deployment, and converted into a simplified format (which may be termed a "suite" in the case of some applications written in Java™) that may be verified and loaded at the device. In addition, various other changes may be made to the application code before it is deployable to the device, such as the substitution of some byte codes by others, the removal of symbol information, and the like.

While the transformation of the application code may be required for deployment at limited-memory systems, both the transformation and the resource constraints on the devices themselves may lead to debugging and maintainability problems. For example, developers who write the application code may typically be familiar with using sophisticated interactive debugging tools to debug their code. Popular, standards-based debugging tools may be incompatible with the transformed versions of the applications; for example, some debuggers designed to interact with standard JVMs and standard Java™ classes may not be able to interact directly with suites at remote devices. As a result, applications developed using high-level languages may not be easily debuggable at the devices for which the applications are designed; e.g., while a developer may test and debug the application on a server or personal computer system at which the application was developed, only limited debugging may be possible on the resource-limited devices at which the applications are ultimately to be deployed. Furthermore, many remote debugging techniques may typically bundle a variety of debugging software modules into logically indivisible "all-or-nothing" packages; e.g., the debugger may not function unless the entire set of debugging modules is deployed at a targeted remote device to be debugged. Such all-or-nothing bundling techniques may not be appropriate for devices with very little memory and very limited power supplies.

SUMMARY

Various embodiments of systems and methods for debugging applications at resource-constrained virtual machines using dynamically installable lightweight debug agents are disclosed. According to one embodiment, a system comprises a target device configured to host a lightweight debug agent to obtain debug information from one or more threads of execution at a virtual machine executing at the target device, and a debug controller. The lightweight debug agent may include a plurality of independently deployable modules. The debug controller may be configured to select one or more of the modules for deployment at the virtual machine for a debug session initiated to debug a targeted thread, to deploy the selected modules at the virtual machine for the debug session, and to receive debug information related to the targeted thread from the lightweight debug agent during the session. In some embodiments, the target device may be a limited-memory device such as a battery-powered wireless sensor device with at most a few hundred kilobytes of memory. In order, for example, to reduce or minimize memory usage at the target device, modules of the lightweight debug agent may be deployed only for as long as strictly necessary: e.g., at the end of a debug session, some or all of the modules may be undeployed or removed from the target device in some embodiments. Some or all of the modules of the lightweight debug agent may be deployed at the target device after the targeted thread begins execution in some embodiments; thus, neither restarts nor special debug versions of the targeted thread and/or the virtual machine may be required for debugging in such embodiments.

In some embodiments, the debug information obtained from the targeted thread may be in a format that is not recognizable by some popular standards-based debugger tools. For example, executable class files of the applications being executed at the target device may be pre-processed prior to deployment into a special compacted and/or simplified format for use in a constrained-memory environment, with some or all of the symbolic information typically used in debuggers removed from the executable files during the pre-processing. In such embodiments, the debug controller may be configured to translate the raw debug information into a standard format recognized by debugger tools and to transmit the translated debug information to a debugger tool (e.g., according to a standard debug information transmission protocol) for analysis by a user such as a software developer. In performing the translation, the debug controller may be configured to use intermediate versions of the application code corresponding to the targeted thread (e.g., versions generated during the process of generating executable code suitable for the target device from the application source code) and/or symbol files for the application. In some embodiments, the virtual machine at the target device may be configured to support the execution of multiple "isolates", where each isolate represents one or more threads of execution, where the address space of any thread of a particular isolate is not accessible from any thread of any other isolate. That is, each thread may be "owned" by a given isolate and may not be accessible from any other isolate. The targeted thread of execution may be included within or owned by one isolate, and the lightweight debug agent may be included within another isolate.

In one embodiment, the lightweight debug agent may comprise a communication driver module, a transport module and a debugging interfaces module. The communication driver module may provide an interface to a hardware communication link (e.g., a serial link) or a wireless communication link that may be used for communication between the target device and the debug controller. The transport module may be configured to format the debug information from the targeted thread according to a transport protocol used for communicating with the debug controller. The debugging interfaces module may provide a set of interfaces for various specific debug functions, such as setting breakpoints, pausing execution of the targeted thread, etc. In one embodiment, a particular communication driver module may be selected for the lightweight debug agent from among a plurality of available communication driver modules, based for example on the functionality of the targeted thread that is to be debugged. For example, if the targeted functionality comprises wireless communication using a communication driver module that could be shared by the targeted thread and the lightweight debug agent, a different communication driver module such as a serial link module may be selected for debugging-related communication, so that the targeted functionality is not unduly impacted by debugging operations.

Figure 1:
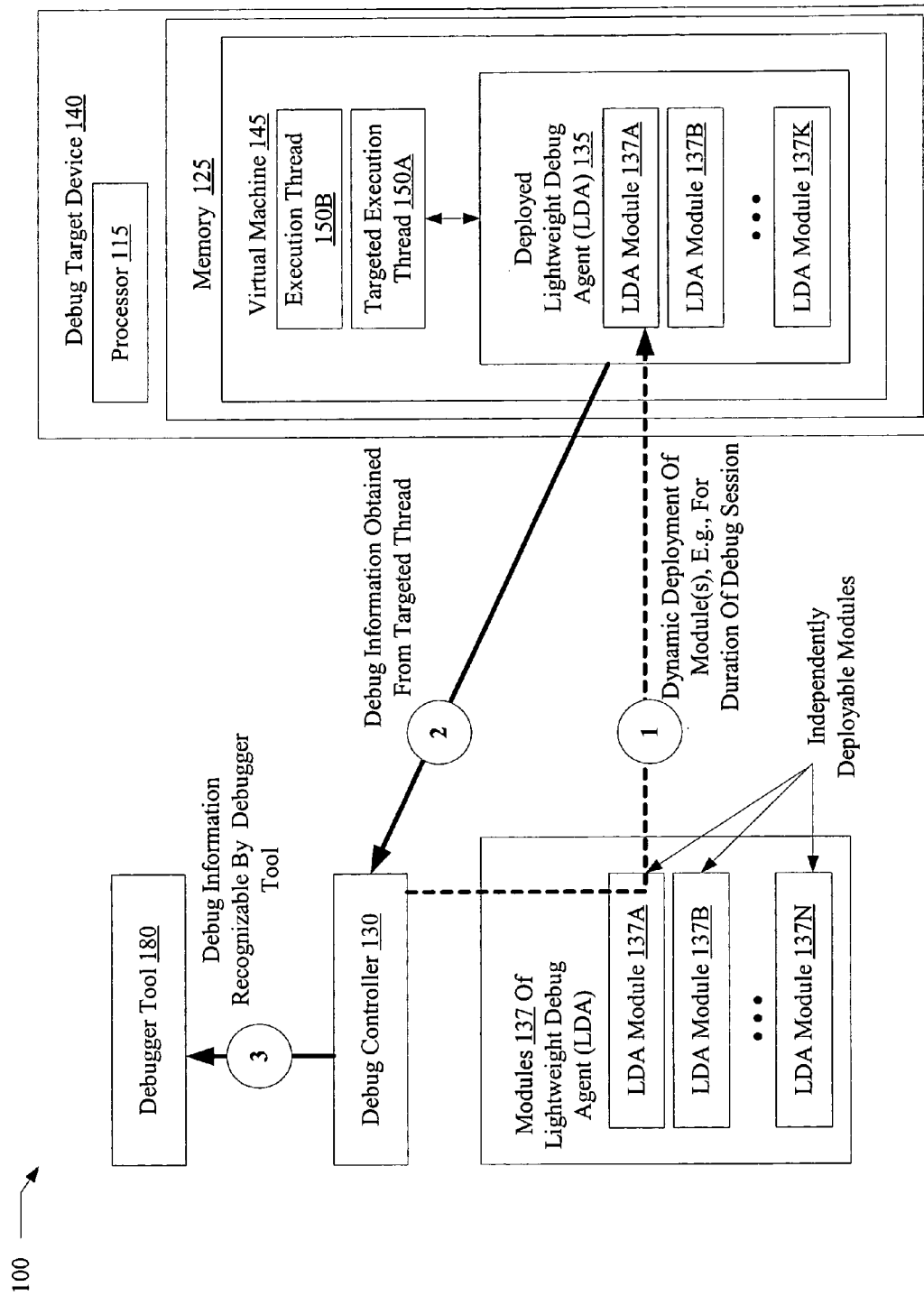
FIG. 1 is a block diagram illustrating one embodiment of a system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

FIG. 1 is a block diagram illustrating one embodiment of a system 100. The system includes a debug target device 140, a debug controller 130 and a debugger tool 180. The debug target device 140 includes a processor 115 and a memory 125 in which a virtual machine (VM) 145 comprising a plurality of threads 150 (e.g., threads 150A and 150B) is resident. In some embodiments, as described below in further detail, the threads 150 may be organized into units of computation called "isolates", where each isolate may include one or more threads 150, such that the memory address space of any of the threads of a given isolate is inaccessible from any other isolate. In embodiments where isolates are employed, the physical memory 125 may be logically divided into isolate-specific memory regions, and the memory within a particular isolate-specific memory region may not be shared across isolates. The debug controller 130 may be configured to coordinate debug sessions during which one or more threads 150 are debugged using a lightweight debug agent (LDA) 135 deployed at the debug target device, as described below in further detail. The debug agent 135 may be termed "lightweight" herein because of its small memory footprint: e.g., the debug agent may use at most a few tens of kilobytes of memory, in contrast to many modern debugging environments that may utilize several megabytes of memory. In one embodiment, a user may initiate a debug session by identifying a target thread 150A to be debugged, e.g., via a graphical user interface (GUI) or a command-line interface of debugger tool 180. The target thread 150A, and/or the application of which the target thread 150A is a part, may already be running at the time that the thread is selected as a target for debugging in some embodiments; thus, specially recompiled or "debug" versions of the thread and/or the virtual machine 145 may not be needed to debug the thread. In addition, part or all of the LDA 135 may not be deployed at the target device 140 until it is actually needed. During the debug session, debug information obtained by the LDA 135 from target thread 150A at the debug target device 140 may be transmitted to the debug controller 130, and by the debug controller to the debugger tool 180, e.g., for analysis by a user. Control information provided by the user to direct the debug session (e.g., to inspect specified variables, to add or remove break points etc.) may flow in the opposite direction: e.g., from the debugger tool 180 to the debug controller 130, and from the debug controller 130 to the deployed LDA 135. In some embodiments, where for example the virtual machine 145 is a special small-memory version of a standard Java™ Virtual Machine (JVM) which implements a different byte code set than the standard Java™ byte code set, the debug information received by the debug controller 130 from the lightweight debug agent 135 may be in a format that is not recognizable by the debugger tool 180. In such embodiments, debug controller 130 may be configured to transform the debug information into an acceptable format (e.g., a format specified in a version of a debugging standard such as Java™ Platform Debugging Architecture (JPDA) and/or the Java™ Debug Wire Protocol (JDWP)) before relaying the information to the debugger tool 180. As a result, even though the target thread 150A may be executing in a severely resource-constrained environment, the same tools and interfaces may be used for debugging the target thread 150A that would normally be used to debug standard applications running on typical server platforms.

In some embodiments, as noted above, debug target device 140 may be a resource-constrained device, e.g., with a relatively simple processor 115, a small amount of memory (e.g., a total memory size of a few hundred kilobytes, with smaller random access memory (RAM) and read-only memory (ROM) subcomponents), a limited (e.g., battery-operated) power supply, and strict restrictions on total weight, volume etc. For example, in one implementation, the debug target device 140 may comprise one among a plurality of wireless sensor devices configured to operate relatively autonomously, collectively executing any of a variety of applications such as environmental or defense-related data gathering, checking for manufacturing defects, tracking inventory, etc. The debug controller 130 may be executed at a remote device in some embodiments, such as a personal computer or workstation from which the debug target device 140 is accessible via one or more communication links. The debugger tool 180 may also be linked to the debug controller 130 via a network or a communication link in some embodiments; thus, the virtual machine 145, the debug controller 130 and the debugger tool 180 may each be executed at separate computing devices in such embodiments. In other embodiments, any combination of the virtual machine 145, the debug controller 130 and the debugger tool 180 may be executed at a single computing device.

In one embodiment, the lightweight debug agent 135 may comprise a plurality of modules 137 (e.g., LDA modules 137A, 137B, . . . 137N), at least some of which are independently deployable to the targeted virtual machine 145. Two modules A and B may be termed "independently deployable" herein if A may be deployed and used at the virtual machine without necessarily deploying and using B. It is noted that there may be a dependency in one direction between independently deployable modules: e.g., A and B may be deemed independently deployable even if B requires A to be deployed, as long as A does not require B to be deployed. In addition to being independently deployable, the modules 137 may also be dynamically deployable in some embodiments, e.g., without requiring an application restart, a virtual machine restart, or a change to the operating environment (such as a class path) of either an application or the virtual machine. Not all the modules 137 may be required to be deployed at the virtual machine 145 for the lightweight debug agent to function correctly. For example, in one implementation, LDA modules 137 may comprise a plurality of communication driver modules, each of which specializes in supporting communication between the debug target device 140 and the debug controller 130 via a particular type of communication link (such as a wireless communication link, a serial communication link, etc.) Debug controller 130 may be configured to determine, based on a number of factors as described below in further detail, which one of the communication driver modules is to be used for debug-related communication with the target debug device 140. From among the plurality of communication driver modules, only the selected communication driver module may actually be deployed for a debug session. By decoupling communication-related modules in this manner, unnecessary deployment of modules 137 that may not actually be used during a debug session may be avoided, helping to reduce the memory overhead of debugging at the target device 140.

In addition, in some embodiments, LDA modules 137 may comprise a variety of other types of modules, including one or more transport modules for transport-layer communication support, one or more debug interface modules for implementing various specific debugging operations, as well as other application specific modules, not all of which may have to be resident at the same time on debug target device 140. Since debugging may be a relatively sporadic activity, one or more modules of the LDA 135 may be undeployed from the target device 140 when they are not in use, further reducing the overall overhead of debugging on other applications. In addition, the decoupling of LDA functionality into independently deployable modules may also allow incremental upgrades or improvements: e.g., a single module 137 of an LDA 135 may be replaced by a newer version without affecting overall debug functionality. In some embodiments, a range of independently deployable modules 137 providing a similar type of functionality may be available: e.g., a simple debug interface module supporting minimal debugging features (such as halting and inspection only) and a more complex debug interface module supporting more advanced debugging features (such as full breakpoint support) may be available, and the debug interface module most appropriate for the target device and application may be selected for a particular debug session.

Debug controller 130 may be configured to select, from among the plurality of LDA modules 137 available for independent deployment at virtual machine 145, the specific set of LDA modules 137 required for a particular debug session. The modules may be selected based on a variety of factors, for example, on the characteristics of an application of which targeted thread 150A is a part, on the specific types of functionality of thread 150A to be debugged during the session, on a knowledge or estimate of the current level of resources available at target device 140, on a knowledge or estimate of bandwidth currently available for communication with target device 140, etc. When the modules that are required have been selected, debug controller 130 may be configured to determine which, if any, of the selected modules are already deployed at the virtual machine 145. In some embodiments, for example, virtual machine 145 may provide a query interface allowing debug controller to determine the set of currently deployed modules at the virtual machine 145, and/or to determine whether a particular module is among the modules deployed at the virtual machine 145. If one or more of the selected modules are not currently deployed, debug controller 130 may be configured to dynamically deploy the needed modules, as indicated by the arrow labeled "1" in FIG. 1. (It is noted that in some embodiments it may be possible that all the needed modules are already deployed before a particular debug session begins, e.g., as a result of a previous debug session, and no additional modules may need to be deployed dynamically in such cases). As indicated by the arrow labeled "2", debug information extracted from the running target thread 150A may be transmitted by the deployed LDA 135 to the debug controller during the session. As described below in further detail, the manner in which debug information is transmitted from LDA 135 to debug controller 130 (e.g., whether execution state information, such as the source code line number corresponding to the currently executed instructions of thread 150A, is transmitted whenever it changes, or only at predetermined points of execution such as specified break points) may be configurable via an interface provided by debug controller 130. The arrow labeled "3" in FIG. 1 indicates the flow of debug information from the debug controller 130 to the debugger tool 180 in a format recognizable by the debugger tool 180. In addition to the flow of modules and information illustrated by the arrows "1", "2" and "3", control information such as commands may also flow from the debugger tool 180 to debug controller 130 (e.g., in response to user input) and from debug controller 130 to deployed LDA 135.

Figure 2:
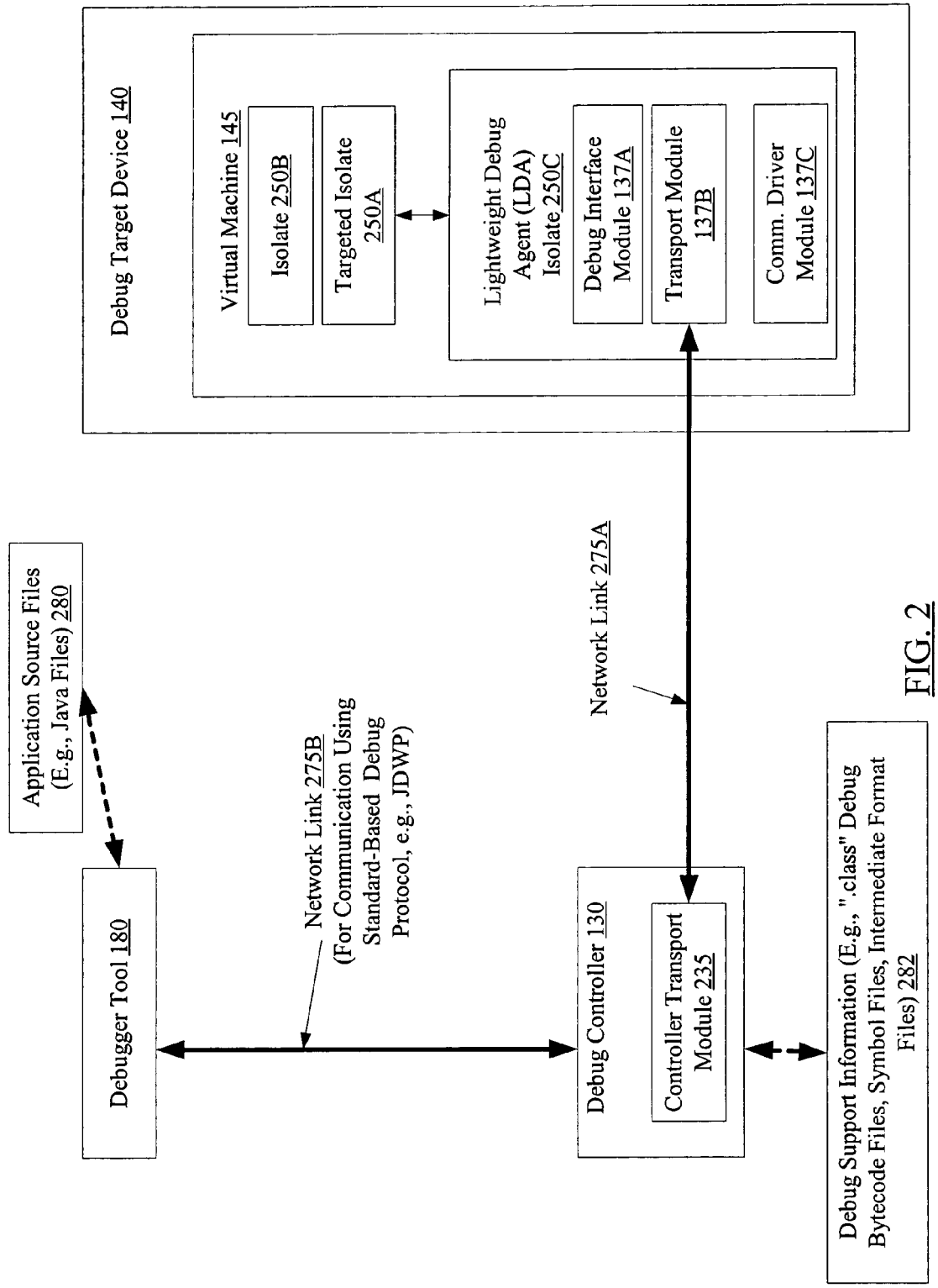
FIG. 2 is a block diagram illustrating an embodiment in which a virtual machine at a debug target device supports the execution of Java™ isolates.

In many computing environments supporting virtual machines 145, each virtual machine is implemented as a multi-threaded process with a relatively large memory footprint and a relatively long startup latency. In addition, at least part of the memory address space accessible from one thread of the virtual machine (e.g., the heap) is typically accessible from one or more other threads within the process, thus reducing or eliminating the ability to adequately isolate state information of one application within the process from another application within the process. While limited mechanisms for supporting inter-application isolation (e.g., class loaders with independent name spaces) are supported in some traditional virtual machine implementations, such mechanisms are often complex and may sometimes lead to subtle errors, especially when arbitrary combinations of non-trivial applications are run within the same virtual machine. While some traditional virtual machine implementations support the ability to start multiple processes (e.g., using the Runtime.execo( ) method in some JVMs), sufficient support to manage, monitor and control the multiple processes at an application level (rather than at an operating system level) has typically been missing. To truly achieve secure and manageable isolation between different applications in many traditional virtual memory implementations, each of the applications often has to be run in a different virtual machine process, thus leading to excessive memory usage and relatively slow application start up. In order to support application isolation more efficiently, some more recent virtual machine implementations have implemented a feature called "isolates". Isolates may be especially well suited for developing applications that are to be run concurrently with other applications in memory-constrained environments. FIG. 2 is a block diagram illustrating an embodiment in which the virtual machine 145 supports the execution of Java™ isolates, i.e. isolates defined in the Java™ programming language. It is noted that functionality equivalent to that of Java™ isolates may also be provided using other programming languages and/or other types of virtual machines in different embodiments. In the remainder of this description, unless specified otherwise, the term "isolate" may be used synonymously with the term "Java™ isolate".

A Java™ isolate is a Java™ object class that provides the means of creating and managing isolated Java computations within a single JVM, and for arranging communication between the isolated computations. Each isolate may comprise one or more threads of execution; the threads of a given isolate may be said to be "owned" by the isolate, and may not be shared by other isolates. The address space of any given isolate may not be accessed from any other isolate; thus, isolates provide a mechanism for logically dividing memory into isolated, non-sharable memory regions. Conceptually, a Java™ isolate may be considered similar in some respects to a Java™ thread (e.g., in that both isolates and threads represent sequences of instructions executed within a JVM in which other sequences of instructions are also executing), although a particular Java isolate within a JVM shares no objects or mutable static state with any other isolate within the JVM, and each isolate may at least in principle comprise one or more threads. To simplify the presentation, the term "thread" may be used generically in the remainder of this description to refer to both threads and isolates. The following code example illustrates the creation of a simple isolate with a single main method argument of "test" and a default context. The created isolate simply prints its argument array:

```
Isolate i = new Isolate("org.example.App", "test");
i.start( ); //start new isolate
// code for newly created isolate follows:
package org.example;
public class App {
    public static void main(String[ ] args) {
        for (int i = 0; i < args.length; i++)
            System.out.println(args[i]);
    }
}
```

Details regarding the development of applications using isolates, such as how class paths are specified, various mechanisms for inter-isolate communication and status determination of isolates, may be provided in various versions of Java™ standards specifications and Java™ Standard Requests (JSRs) in various embodiments. In some embodiments, a special isolate called a meta-isolate may be run at virtual machine 145 to support various management and control functions, such as reporting a status of the device 140, pausing and resuming applications on demand, etc.

In the embodiment depicted in FIG. 2, the virtual machine 145 executes a plurality of isolates 250, including a target isolate 250A from which debug information is to be obtained, a lightweight debug agent isolate 250C, and one or more other isolates such as isolate 250B. In some embodiments, the virtual machine 145 may also include one or more other threads of execution that are not included within isolates. When debugging isolates such as target isolate 250A, debugging constructs such as breakpoints may be set within the scope of a single isolate in some implementations. Multiple isolates 250 running at the same debug target device may be debugged concurrently in some embodiments. In one embodiment, a separate debug session may be initiated to debug each target isolate 250 to be debugged, while in other embodiments, more than one isolate may be debugged during a single debug session, e.g., a session initiated by a user identifying a plurality of isolates. Multiple threads of a single isolate may be debugged in a single session in some embodiments. The debugging of one isolate may not have any effect on other concurrent isolates; e.g., when one application isolate 250A is being debugged by an LDA isolate 250C, no additional inter-isolate communication (e.g., between isolate 250A and 250B) may be needed. In some implementations, users may specify an isolate targeted for debugging by specifying an absolute isolate address using an isolate address format similar to that used for URLs (Uniform Resource Locators), such as "Debug://deviceID//isolateID", where deviceID and isolateID are strings or numbers identifying debug target device 140 and target isolate 250A, respectively. In other implementations, virtualized addressing may be used, where, for example, symbolic addresses such as "Debug://XYZisolate" may be translated to absolute addresses by an isolate name translator, which may be implemented either at target debug device 140 or external to target debug device 140. Other isolate address formats may be used in some embodiments.

The LDA isolate 250C in the embodiment shown in FIG. 2 comprises a debug interface module 137A, a transport module 137B, and a communication driver module 137C. The debug interface module 137A may include a number of debugging interfaces used to implement a desired set of debugging functions, such as setting or resetting break points, obtaining values of variables used in the target isolate, obtaining stack frame information, issuing debug commands such as "run to next break point", etc. The transport module 137B of the lightweight debug agent 135 may be configured to communicate with a corresponding controller transport module 235 at the debug controller, e.g., using a transport-layer protocol. The communication driver module 137C may provide an interface between the transport module 137C and the underlying communication link, such as serial line or a wireless link. One or more of the modules 137A-137C may be dynamically installed or deployed within virtual machine 145 by debug controller 130 for the debug session, e.g., via network link 275A. Debug controller 130 may be configured to communicate with debugger tool 180 over a second communication link 275B, e.g., using a standards-based debug wire protocol for remote debugging, such as JDWP.

To assist in the process of debugging, a variety of support information 282 may be used in the embodiment shown in FIG. 2. For example, applications that are deployed to debug target device 140 as isolates 250 may be initially written in a high-level programming language such as Java™, e.g., using an integrated development environment or IDE. The source code in the high-level programming language may then be translated into one or more intermediate formats before being converted into a format suitable for deployment and execution at debug target device 140. In one embodiment, for example, Java application source code 280 may be compiled into a plurality of class files, including at least some class files compiled with a "debug" option, so that additional information (e.g., information not necessarily essential for simply performing the functionality of the application) useful during debugging may be retained in the debug versions of the class files. In addition, in some embodiments, files containing symbol tables and/or other debug-related information may also be accessible to debug controller 130. In embodiments where the debug controller 130 is configured to translate raw debug information provided by lightweight debug agent 135 into a different format recognizable by debugger tool 180, the debug controller may use the support information 282 such as debug versions of class files, symbol files, etc., in mapping the raw debug information into a standard format before transmitting the information to the debugger tool 180. In turn, the debugger tool 180 may use the application source code 280 in combination with the translated debug information provided by the debug controller to present the debug information in human-readable format to a user such as a software developer participating in the debug session.

In some embodiments, in order to accommodate strict resource limitations at the debug target device 140, the virtual machine 145 may implement a number of special features that may not be implemented in standard virtual machines run at more resource-rich servers. For example, in one implementation, the debug target device 140 may be a sensor or transducer (i.e., a sensor combined with an actuator) device with an ARM central processor unit (CPU) and an 11 channel 2.4 GHz radio conforming to the IEEE (Institute for Electrical and Electronics Engineers) 802.15.4 standard for wireless communication. The debug target device may be limited to at most 64 kilobytes of RAM and 256 kilobytes of ROM in such an implementation. Alternatives to wireless communication, such as communication over serial links or other types of communication links such as Ethernet, Fibre Channel, etc., may also be supported in some embodiments. A virtual machine 145 for such a device may conform to a standard specification targeted at small devices, such as a version of the J2ME™ (Java™ 2 Platform, Micro Edition) standard specification, and may implement a set of features of a "small programmable object technology" (SPOT) system developed by Sun Microsystems. A virtual machine 145 based on SPOT may also be termed a "Squawk" virtual machine or Squawk VM. In some embodiments, a Squawk VM 145 may be implemented entirely or at least mostly in Java, and unlike most JVMs, may not need an underlying operating system to be present at the device 140: that is, the Squawk VM 145 may run directly on the hardware of the debug target device 140, without requiring external support from a computer operating system. Applications targeted for a Squawk VM 145 may be written in Java™, and the class files (executable byte code derived from application Java™ source code) may be preprocessed off-device (i.e., at a device other than the debug target device 140) and packaged into a smaller representation called a "suite", which may then be verified and loaded on the debug target device 140. For example, the modules 137A-137C shown in FIG. 2 may each be implemented as a respective suite in some embodiments employing a Squawk VM 145. The class file preprocessor may replace some Java byte codes with other, semantically equivalent and more compact byte codes that may simplify code verification and garbage collection and may require less memory. A number of other features to streamline and simplify execution may be implemented in various embodiments of a small virtual machine such as Squawk: for example, symbolic references within the executable byte code may be resolved prior to loading the suites, object creation may be recast into an equivalent form that makes verification more efficient, a region-aware memory manager that uses non-volatile memory for persistent data may be employed, etc. In general, an implementation of small virtual machines such as Squawk VM 145 may be guided by the goal of offloading as much work outside the small target devices 140 as possible, without making so many changes to the software development process that software developers are forced to give up the use of familiar software development tools in developing, testing and/or maintaining applications for the small target devices.

Figure 3:
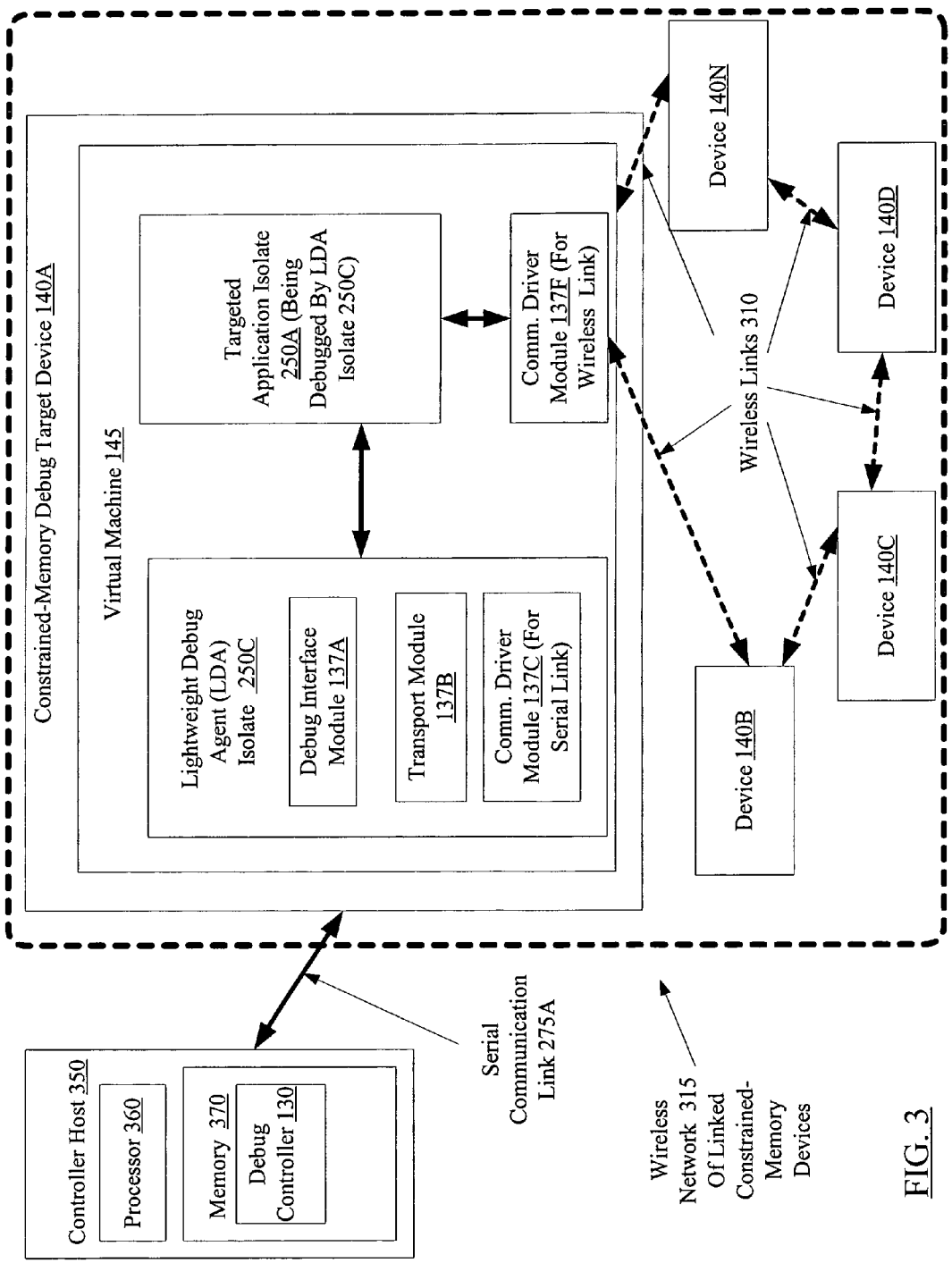
FIG. 3 is a block diagram illustrating an embodiment in which a debug controller may be configured to select a type of communication link and a corresponding communication driver module to be used for transfer of debug-related information from a debug target device.

FIG. 3 is a block diagram illustrating an embodiment in which the debug controller 130 may be configured to select a type of communication link to be used for transfer of debug-related information from the debug target device 140, and to deploy a communication module 137 corresponding to the type of communication link selected. In the depicted embodiment, the debug controller 130 is resident within a memory 370 of a controller host 350 with one or more processors 360. The debug target device 140A is one of a plurality of constrained-memory devices 140 (e.g., 140A-140N) in a wireless network 315, and is linked to the controller host 350 via serial link 275A (e.g., a serial link attached to a base station for the target device). Each of the constrained-memory devices 140 may be configured to execute its portion of a distributed application, such as an environmental data gathering application, and may be configured to communicate with one or more other devices 140 either periodically (e.g., at fixed time intervals) or sporadically (e.g., as needed, based on the device's current state and/or input received from other devices) over wireless links 310. The applications running on the devices 140 may be implemented using isolates within small virtual machines such as a Squawk VM in some embodiments. In the depicted embodiment, for example, the target isolate 250A to be debugged may be configured to communicate with other devices 140 of wireless network using a communication driver module or suite 137F. The communication driver module 137F may also be usable for communication between the debug target device 140 and the debug controller 130; thus, in the depicted embodiment, it may be possible for the lightweight debug agent isolate 250C to share use of a particular module 137 with other isolates and/or applications.

In selecting a set of modules 137 to be used by LDA isolate 250C in the embodiment of FIG. 3, debug controller 130 may be configured to first identify the set of modules or suites being used by the targeted isolate 250A. For example, debug controller 130 may determine that the targeted isolate 250A is using module 137F for wireless communication with other devices 140. A user participating in the debug session via the debugger tool 180 may explicitly or implicitly identify the set of modules in use by the targeted isolate in some embodiments; in other embodiments, a query interface supported by the virtual machine 145 or a meta-isolate may be used. Having identified the set of modules being used by the targeted isolate 250C, debug controller 130 may be configured to determine whether any communication-related module such as 137F that is being used by the targeted isolate 250A should also be used for debugging-related communication between the target device 140 and the debug controller 130. The decision of whether it is appropriate to use module 137F for debugging-related communication may be based on any of a variety of factors in different embodiments. For example, if communication-related functionality of targeted isolate 250A (e.g., functionality of isolate 250A that utilizes module 137F) is to be debugged, it may be inappropriate to use module 137F for debugging-related communication, since the debugging-related communication may affect or interfere with the operations to be debugged. In this case, another communication driver module (e.g., module 137C for communication over serial link 275A) may be selected for debug-related communication. If, however, the communication-related functionality of targeted isolate 250A is not to be debugged during the debug session, it may be appropriate to use module 137F for debug-related communication, thus potentially avoiding the deployment of an additional debug-communication-specific module such as module 137C and further avoiding increased memory usage at target device 140A. In some embodiments, even if communication-related functionality of target isolate 250A is not to be debugged during the debug session, debug controller 130 may still determine that a different communication driver module such as 137C should be used if sufficient resources are available to deploy the different module, for example in order to reduce the impact of the debug session on the target isolate 150A as much as possible. It is noted that if no other communication mechanism for transmitting debugging-related data is available (e.g., if other communication links such as serial links, Ethernet, etc. all happen to be unavailable) for the debug session, the module 137F may have to be used for debugging-related communication.

If the communication driver module selected for use in transmitting debug-related information is not already deployed at the target device 140, it may be dynamically deployed to the virtual machine 145, along with any other modules 137 needed for the lightweight debug agent isolate that are also not already deployed. When all the modules required by LDA isolate 250C have been deployed at virtual machine 145, the transfer of debugging data from the targeted isolate may be initiated. In some embodiments, when the debug session ends, debug controller 130 may be configured to undeploy at least some of the modules 137 that were used for debugging and are no longer in use, e.g., so that unnecessary memory usage at target device 140 may be reduced or eliminated. For example, if any of modules 137A, 137B or 137C is no longer in use, it may be undeployed or removed from the virtual machine 145 at the end of the debug session. In one embodiment, one or more modules 137 that may not be in use after the debug session ends, but may be sharable with other isolates, or may be expected to be in use at the target device 140 at some point in the future, may not be undeployed at the end of the debug session. If, for example, communication driver module 137C for serial link communication may be used by isolates other than LDA isolate 250C, module 137C may not be removed from target device 140. Also, in another example scenario, if another debug session is expected shortly after one debug session ends (e.g., after a developer makes changes to the code being debugged and wishes to try out the changes relatively quickly), the modules 137A-137C may not be removed from virtual machine 145 after the first debug session ends. In some embodiments, it may be possible to debug one LDA isolate using another LDA isolate using the techniques described above: e.g., an LDA isolate that uses a wireless link may be debugged using another LDA isolate that uses a serial link, or an LDA isolate that uses a serial link may be debugged using another LDA isolate that uses a wireless link.

Figure 4:
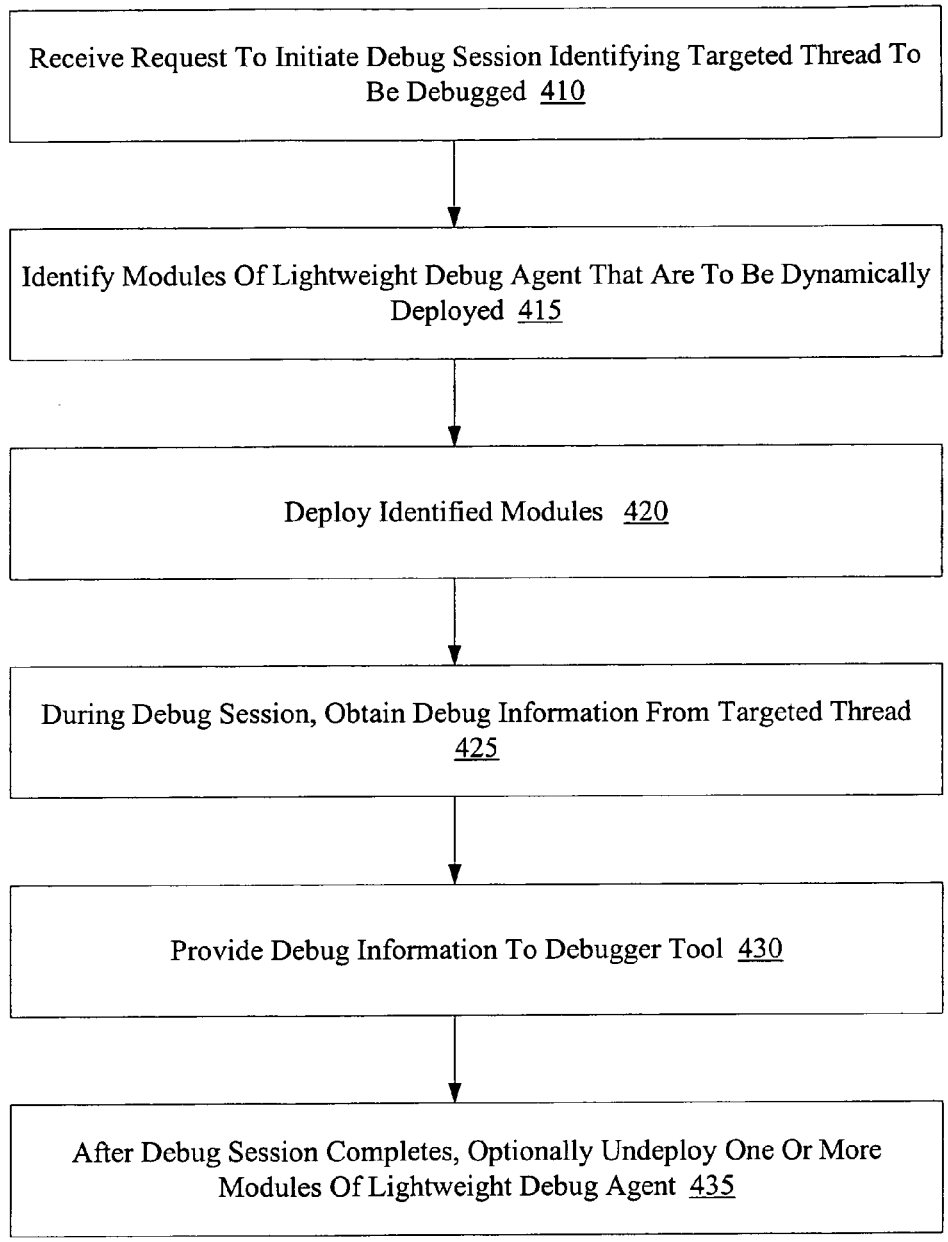
FIG. 4 is a flow diagram illustrating aspects of the operation of a debug controller and a lightweight debug agent, according to one embodiment.

FIG. 4 is a flow diagram illustrating aspects of the operation of debug controller 130 and lightweight debug agent 135, according to one embodiment. The debug controller 130 may receive a request to initiate a debug session to debug a targeted thread of execution, as shown in block 410 of FIG. 4. In one embodiment, a user such as a software developer may initiate the debug session using an interactive debugger tool 180. The debugger tool 180, which may be a part of a commercially available or open source integrated development environment such as NetBeans™, Eclipse™, or IntelliJ IDEA™, may be compatible with a standard debugging architecture such as JPDA (Java Platform Debug Architecture) in some embodiments. The user may, for example, provide an identification of the target device 140 (e.g., using a device identifier) and the specific targeted thread (e.g., using a thread identifier or an isolate identifier) via a GUI or a command line interface to initiate the session, and the input provided by the user may be transmitted to the debug controller using a standard debug wire protocol such as JDWP (Java™ Debug Wire Protocol). In some embodiments, before a debug session for a specific target thread or isolate is initiated, the debug controller may provide a list of debuggable target devices 140 and/or debuggable threads or isolates to the user, and the user may select from among the debuggable target devices, threads and isolates to initiate the debug session. Multiple threads and/or multiple target devices may be selected for coordinated debugging in some embodiments. In some implementations, the targeted thread or threads may already be running at the virtual machine 145 when the user selects which threads are to be debugged, and no recompilation, redeployment or restarting of targeted threads or the virtual machine may be needed for the debug session.

After the user selects a target device 140 and a target thread 150 (or target isolate 250) for the debug session, the debug controller 130 may be configured to identify modules 137 of the lightweight debug agent 135 that are to be dynamically deployed (block 415 of FIG. 4). In some embodiments, when selecting the modules to be deployed, the debug controller may first identify a set of already-deployed modules at the virtual machine 145 at which the targeted thread executes, e.g., using a query interface supported by the virtual machine 145. If some modules 137 that may be used by the LDA 135 are already deployed, and if their use for debugging purposes is not expected to alter the behavior of debugged thread 150 enough to substantially affect the behavior of the debugged application, the already-deployed modules 137 may be used for the LDA 135. It is noted that some already-deployed modules may be in use by other applications or by the targeted thread, while other already-deployed modules 137 may not currently be in use (e.g., if they have been left in a deployed state from a previous debugging session, or left over deployed by another application that is no longer running). Any modules 137 that are required for LDA 135 and are not currently deployed may then be dynamically deployed to the virtual machine 145 (block 420), and the debug session may begin.

During the debug session, debugging information may be obtained by the lightweight debug agent 135 from the targeted thread 150, and may be transmitted, e.g., over a communication link such as a wireless link, a serial link, Ethernet, Fibre Channel, etc., to debug controller 130 (block 425). The transmission of the debugging information may be performed in accordance with a transport-layer protocol implemented cooperatively by LDA 135 and debug controller 130 in some implementations, e.g., using the transport modules 137B and controller transport module 235 of FIG. 2. The debug information may include a variety of different types of data, such as the values of variables, the contents of an application stack frame, etc. and may be retrieved at specific points (e.g., break points) during the execution of the targeted thread 150. The break points may be set and/or unset interactively by users of debugger tools 180 in some implementations. In embodiments employing constrained-memory virtual machines such as Squawk VM, where for example the byte codes have been simplified or altered from the byte codes used in standard virtual machines, the raw debug information obtained by the LDA 135 may be at least partly unrecognizable by in standards-based debugger tools 180 that rely on standard byte code sets and standard organization of source code. The debug controller 130 may translate the raw debug information into a format recognizable by standards-based debugger tools 180, and transmit the translated debug information to a particular debugger tool 180 being used by the user who initiated the debug session (block 430).

The debugger tool 180 may display the debugging information to the user in a format that has the appearance of typical debug information obtained from a standard application. After analyzing the displayed debugging information, the user may provide additional debugging control instructions (e.g., to continue to a next breakpoint, to add or remove breakpoints, to request values of specified variables etc.) using the debugger tool 180. The additional instructions may be relayed from the debugger tool 180 to the virtual machine 145 by the debug controller 130. In some implementations, a mechanism may be provided for direct transmission of some commands from the debugger tool 180 to the virtual machine 145, e.g., without the participation of debug controller 130, and/or for direct transmission of debug information from the virtual machine 145 to the debugger tool 180. The user may eventually terminate the debug session, e.g., after enough information has been obtained on a problem being debugged. In some embodiments, after the debug session has been terminated, one or more modules of the LDA 135 may be optionally undeployed or removed from the virtual machine 145 by debug controller 130 (block 435 of FIG. 4). In other implementations, the undeployment of unused modules may be initiated by the virtual machine 145 itself, e.g., instead of relying on an external entity such as debug controller 130 for removal of unneeded modules. In one implementation, either the virtual machine 145 or the debug controller 130 may initiate the undeployment of unused modules 137. The removal or undeployment of modules 137 may not be tightly coupled to the termination of a debug session in some embodiments: e.g., the virtual machine 145 may include a "clean-up" thread or isolate that periodically checks for the presence of unused deployed modules and undeploys unused modules based on a retention policy in some embodiments.

Figure 5:
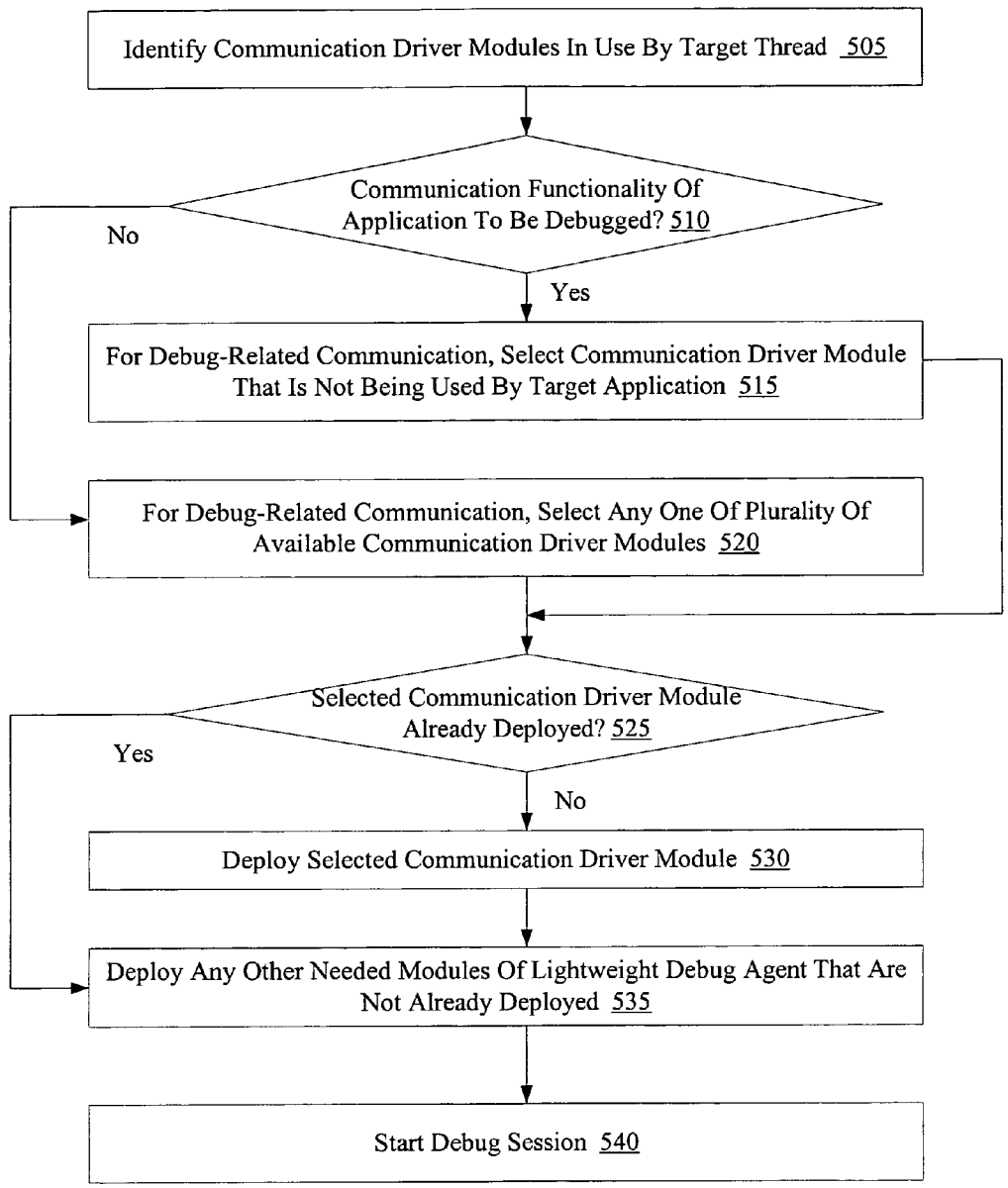
FIG. 5 is a flow diagram illustrating aspects of the operation of a debug controller during a selection of a communication driver module, according to one embodiment.

FIG. 5 is a flow diagram illustrating further aspects of the operation of debug controller 130 during a selection of a communication driver module 137 to be used for transmission of debugging information and/or commands between a lightweight debug agent 135 at debug target device 140 and the debug controller. The debug controller 130 may be configured to identify any communication driver modules 137 that may be in use by the targeted thread 150 (block 505). If communication-related functionality of the target thread 150 is to be debugged (as determined in decision block 510), or if a shared use of a communication driver module 137 by the target thread and the lightweight debug agent may result in excessive interference with the work of the target thread, the debug controller 130 may be configured to select a different communication driver module for debug-related communication than the one being use by the target thread (block 515). For example, if the target thread is using communication driver module 137F shown in FIG. 3 for wireless communication, and if the communication functionality of the targeted thread is to be debugged, communication driver module 137C for a serial link may be chosen for debug-related communication. If communication functionality of the target thread is not to be debugged during the debug session, any one of the available communication driver modules, including for example the module in use by the target thread, may be selected (block 520). If the selected communication driver module is not already deployed at the virtual machine 145 (as determined in decision block 525), it may be dynamically deployed (block 530). Any other modules 137 that are also needed for debugging and are not currently deployed may then be dynamically deployed (block 535) and the debug session started (block 540). In some embodiments, the user that initiates the debug session may indicate the set of modules 137 that are potentially to be debugged during the session, e.g., by either explicitly naming the modules or indirectly, e.g., by setting break points in a section of code that utilizes one or more modules 137 or forms part of the modules 137, enabling debug controller 130 to identify the specific type of functionality to be debugged. In some implementations, the user may specify the type of communication link to be used for debug-related data transmission, thus simplifying the selection of the communication driver modules by the debug controller. Decoupling communication-related modules from one another in the manner described above, so that modules for different types of communication links may be deployed independently as needed, may thus help to reduce the memory footprint of debugging operations, and may also allow remote debugging of one type of communication mechanism using another communication mechanism.

Figure 6:
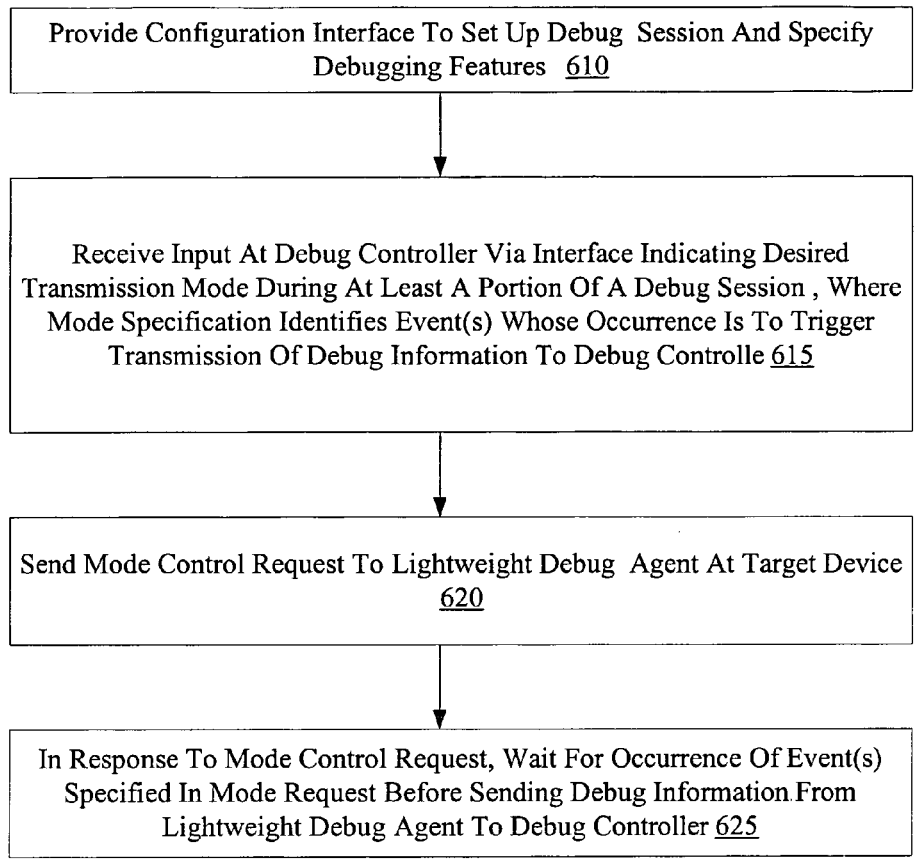
FIG. 6 is a flow diagram illustrating aspects of the operation of a debug controller in an embodiment where a configuration interface is provided to set up and/or personalize debug sessions.

FIG. 6 is a flow diagram illustrating aspects of the operation of the debug controller 130 in an embodiment where a configuration interface is provided to set up and/or personalize debug sessions. The debug controller 130 may be configured to provide the configuration interface for setting up debug sessions and/or specifying specific features, user preferences, etc. that are to be used during one or more debug sessions (block 610). The interface may be part of a user interface provided by the debugger tool 180 in some implementations, and may be independent of the debugger tool 180 in other implementations (e.g., the interface may comprise one or more web pages that are accessible independently of the debugger tool 180). A number of different parameters may be specified using the configuration interface in different embodiments, such as locations of various support files that may be used by debug controller 130 in translating raw debug data into recognizable or standard formats, preferred modes of debugging data transfer (e.g., whether raw debug data should be combined into larger packets or bundles before transmission from the target device 140, or should be sent as soon as it is available), etc. Bundling debug information, or otherwise reducing the amount of debug-related network traffic between the target device 140 and the debug controller 130, may be useful in reducing the resource consumption (e.g., battery power) of the target device 140. In the embodiment depicted in FIG. 6, the debug controller may be configured to receive as input an indication of a desired transmission mode during at least a portion of the debug session. The user may indicate, e.g., via a directive issued using the configuration interface, that until another overriding directive is received or the debug session ends, debug information is only to be transmitted when a break point is reached during the execution of the target thread 150 (instead of, for example, being transmitted whenever instructions corresponding to a different line of source code is executed). Thus, the user may specify one or more events whose occurrence is to trigger transmission of debug information from the virtual machine 145 to the debug controller 130 (block 615).

In response to receiving the input specifying a desired mode of debug information transmission, the debug controller 130 may be configured to send a mode control request to the lightweight debug agent 135 at the target device 140 (block 620). In turn, when the lightweight debug agent 135 receives the mode control request, the agent 135 may wait for the next occurrence of a specified event before sending any debugging data back to the debug controller (block 625). The user may send other directives overriding the current mode control directive before the debug session ends, causing the LDA 135 to switch to other transmission modes (e.g., by reverting to the original transmission mode). In some embodiments, the LDA 135 may be configured to send an indication of a low level of available power or a low level of some other resource to the debug controller 130, which the debug controller may use to send a hint or suggestion to the user that the mode of debug information transmission should be changed. In response to the hint, the user may specify a new mode of transmission using the configuration interface. In some embodiments, the user may use the configuration interface to allow the LDA 135 to operate in an autonomous mode, in which LDA 135 may be configured to switch transmission modes when needed, without waiting for a specific request from the user. In embodiments where the LDA 135 switches transmission modes autonomously, the LDA 135 may send an indication or message to the user via the debug controller 130 when it switches transmission modes.

Figure 7:
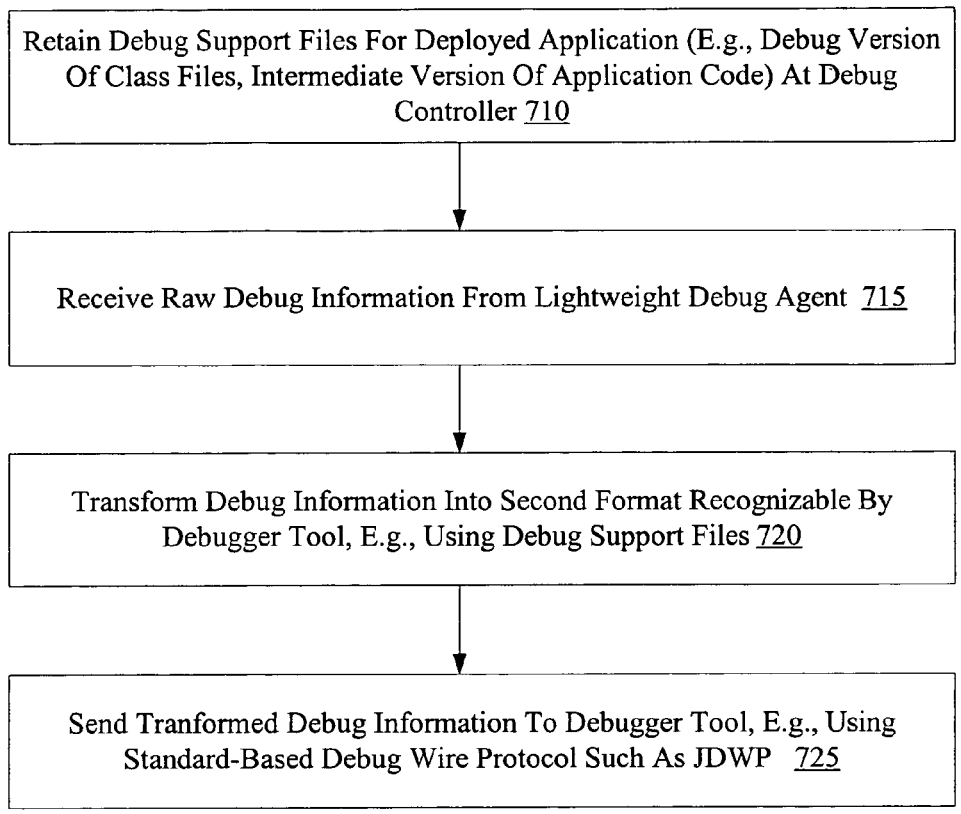
FIG. 7 is a flow diagram illustrating aspects of the operation of a debug controller related to a translation of raw debug data into a format recognizable by a debugger tool, according to one embodiment.

In some embodiments, as described earlier, debug controller 130 may be configured to translate or transform raw debugging data obtained from the target thread 150 into a format recognizable by the debugger tool. FIG. 7 is a flow diagram illustrating aspects of the operation of the debug controller related to such a translation, according to one embodiment. In keeping with the design goal of allowing software developers to use familiar tools and techniques when designing and developing applications for the target devices 140, such applications may be developed in some embodiments in a standard high-level language such as Java™ using any desired integrated development environment such as NetBeans™, Eclipse™, IntelliJ IDEA™, etc. The application source code may be developed at any desired combination of computer systems, such as personal computers, workstations, or servers, some of which may be linked to a source code repository. The source code of the application may first be compiled into executable byte code (e.g., Java™ class files) using standard compilation techniques.

Before deployment to virtual machines 145 such as Squawk VM at constrained-memory devices 140, the application class files may be preprocessed into suites as described above, e.g., into a more compact and simplified format than standard class files. In some embodiments, a "shadow suite" file comprising various symbols defined in the application may be created during a preprocessing phase. Various intermediate format versions of the application code (such as debug versions of class files) may also be created during the transformation of the application code into a version executable at the virtual machine 145. These intermediate format versions may not need to be retained for the execution of the application at the target devices. However, instead of, for example, allowing the intermediate format versions and the shadow suite file to be discarded, at least some of the intermediate format versions and the shadow suite file may be retained in the embodiment depicted in FIG. 7 for potential use in the translation of raw debug information for the application's threads by the debug controller 130 (block 710 of FIG. 7. When the debug controller 130 receives the raw debug data from the LDA 135 (block 715), the debug controller may access the retained shadow suite file and/or some or all of the intermediate versions of the application code to transform the raw debug data into a format understood by the debugger tool (block 720). The transformed version of the debug data may then be transmitted to the debugger tool (block 725), e.g., using a standard debug wire protocol such as JDWP. The debugger tool 180 may in turn utilize source code of the application (e.g., to map debugging information to source code lines) in presenting debug information to the user. Thus, in addition to its role in deploying and/or undeploying modules of the LDA 135 to the debug target device 140, debug controller 130 may also function in some embodiments as a translator between a high-level language and software development environment with which software developers are familiar, and a resource-constrained execution environment of the debug target devices 140. For example, some versions of JPDA, with which debugger tool 180 may be compliant, may have no concept of isolates, and the debug controller 130 may be configured to map isolates into terms understood by the JPDA-compliant debugger tools. It is noted that for some debugger tools 180, no translation of the raw debug data may be required; e.g., some debugger tools may be operable to perform any needed translation. It is also noted that while any desired application thread 150 or isolate 250 running at the virtual machine 145 may be debugged using the mechanisms described above, in some embodiments, there may be no requirement to be able to debug the virtual machine 145 itself.

Figure 8:
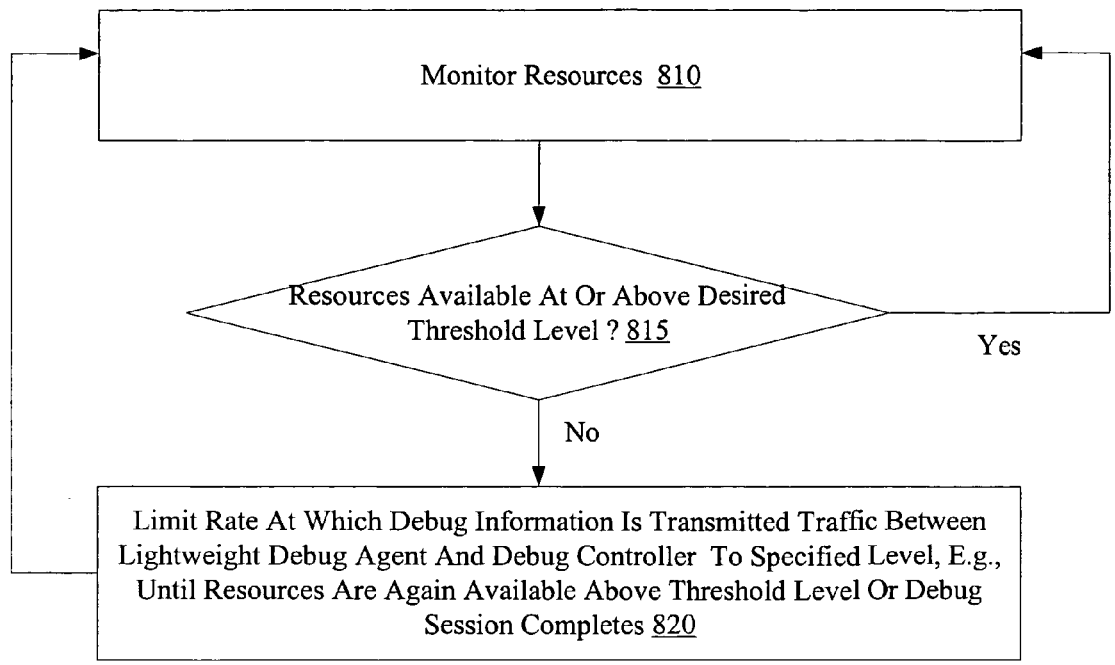
FIG. 8 is a flow diagram illustrating aspects of the operation of a lightweight debug agent configured to react to changes in available resource levels, according to one embodiment.

In some embodiments, debug target devices 140 may be configured to operate relatively autonomously, and may, for example, be configured to change their behavior in response to detected changes in the environment or in other devices to which they are linked. For example, some applications deployed at the target devices 140 may be configured to start operating in a "degraded" or "low-resource-consumption" mode when the available level of a particular resource (such as battery power) falls below a certain threshold. In one embodiment, the LDA 135 may also be configured to respond to changes in the operating environment by reducing the amount of debug-related data traffic it generates. Such a reactive or responsive LDA may be used, for example, to debug degraded mode operations of applications in such an embodiment. FIG. 8 is a flow chart illustrating aspects of the operation of an LDA 135 configured to react to changes in available resource levels, according to one embodiment. One or more resources (such as battery power, available bandwidth, processing power, etc.) may be monitored at or from the debug target device (block 810 of FIG. 8), e.g., either periodically or continuously. In one implementation, for example, a resource monitoring isolate or thread may be executed at the virtual machine 145 to track available levels of resources. If a particular resource is found to be no longer available at a desired threshold level (as detected in block 815), e.g., if battery power falls below a threshold, the LDA may be configured to adjust its behavior accordingly, e.g., by reducing the rate at which debug data is transmitted to the debug controller 130 until the debug session ends or the resource level rises to the desired threshold (block 820). As noted earlier in conjunction with the description of FIG. 6, in some embodiments a user may use a configuration interface to enable such autonomous responsive behavior.

In some embodiments, the target debug device may be a constrained-memory sensor device implementing a variety of features of Sun Microsystems' SPOT (small programmable object technology) system. Such a device may be termed a "SPOT" device or a "Sun SPOT" device herein. SPOT devices may be used, for example, to implement "smart dust" networks of tiny wireless micro-electro-mechanical sensors (MEMS) that could track and report environment changes (e.g., temperature variations), enemy troop variations, and the like. They may also be used to identify manufacturing defects by sensing out-of-range vibrations in industrial equipment, to monitor patient movements in a hospital, to track fertilizer runoff from farms into waterways, to ascertain the origin of a gunshot, or (e.g., in conjunction with Radio Frequency Identification Devices (RFIDs)) to control light, heat and appliance settings in buildings. SPOT devices may also be used in gesture interfaces, e.g., allowing hand gestures to control devices without the use of knobs, dials, etc. In some embodiments, "swarms" or collections of SPOT devices may be configured to collectively respond to high-level management commands, e.g., to perform coordinated distributed operations. In some implementations, each SPOT device may comprise a 32-bit processor (such as an ARM-7 processor), a radio such as a 2.4 GHz radio compliant with the IEEE 802.15.4 standard, and a sensor board for I/O, as well as a limited amount (e.g., 256 or 64 kilobytes) of FLASH memory. (In other implementations, other types of processors, radio etc. may be used.) Traditional operating systems may not be required for the SPOT device in some embodiments; instead, a virtual machine 145 written mostly or entirely in a language such as Java™ may be used directly on the hardware. By eliminating the need for an operating system, and allowing modules 137 including I/O or communication modules to be dynamically deployed, a SPOT device may allow users to experiment with various low-level functionality typically hidden by operating systems in traditional computer hosts. A set of libraries may be provided in some embodiments, allowing users to access the sensors, I/O pins on the sensor boards, and the integrated on-board radio. A J2ME™-compliant virtual machine 145 may be run on the SPOT device, supporting the deployment and execution of various isolates for applications and for the LDA 135. The virtual machine may comprise a bootstrap suite to support automatic start up. A special isolate called a "meta-isolate" may be run on each SPOT device in some embodiments to provide status information, to control application starting, stopping and restarting, and the like. Applications may be migratable (along with complete application state) in some embodiments between different SPOT devices linked to each other. Over-the-air reprogramming capability may be supported in some implementations, so that, for example, large numbers of SPOT devices or SPOT devices deployed in hostile or difficult terrain may be easily reprogrammed. A collection of SPOT devices may be interconnected via a wireless mesh network in some embodiments to provide support for fault tolerance, and one or more SPOT devices may also be connected to the Internet. In some implementations, a small-footprint, secure web server may also be deployed at SPOT devices, allowing interactions with the devise via a browser interface.

In various embodiments, the debug controller 130, the debugger tool 180 and the virtual machine 145 at which the thread targeted for debugging runs may be hosted at any of a variety of types of computing devices. While the techniques described above, such as dynamic deployment of debugging modules, dynamic selection of communication links for debug information, etc., may be employed to debug applications running on constrained-memory devices such as SPOT devices, the use of such techniques is not limited to small-memory devices. In some embodiments, for example, the targeted debug device 140 may comprise a computer server, a personal computer, or a workstation. Similarly, the debug controller 130 and the debugger tool 180 may each run on any desired computing system such as a server, a personal computer etc. In some embodiments, any combination of the debug controller 130, the debugger tool 180 and the virtual machine 145 may run on the same computing device. The computing device may include one or more processors implemented using any desired architecture or chip set, such as the SPARC™ architecture from Sun Microsystems or the x86-compatible architectures from Intel Corporation, Advanced Micro Devices, etc. Any desired operating system may be run on the computing device, such as various versions of Solaris™ from Sun Microsystems, Linux, Windows™ from Microsoft Corporation, etc. In some embodiments, the debugger tool may be run on a computer host with a different operating system than the host running the debug controller 130. Program instructions that may be executable to implement the functionality of virtual machines 145, debug controller 130 and/or debugger tool 180 may be partly or fully resident within a memory at the computing device at any given point in time, and may also be stored on a storage device such as a disk or disk array accessible from the processors. In various embodiments, debugger tool 180, debug controller 130 and LDA 135 may each be packaged as a standalone application, or may be packaged along with an application server or included within a suite of software tools. The memory used to store the program instructions may be implemented using any appropriate medium such as any of various types of RAM (e.g., DRAM, SDRAM, RDRAM, SRAM, etc.). In addition to processors and memory, the computing device at which any combination of the debug controller 130, the virtual machine 145 and the debugger tool 180 is run may also include one or more I/O interfaces providing access to storage devices, one or more network interfaces providing access to a network, and the like. Any of a variety of storage devices may be used to store the program instructions as well as application data in different embodiments, include any desired type of persistent and/or volatile storage devices, such as individual disks, disk arrays, optical devices such as CD-ROMs, CD-RW drives, DVD-ROMs, DVD-RW drives, flash memory devices, various types of RAM and the like.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
a target computer device configured to host a lightweight debug agent configured to facilitate debugging of one or more threads of execution at a virtual machine executing at the target device, wherein the lightweight debug agent is capable of pausing execution of the thread at a given point during debugging; and
a debug controller configured to:
receive a request to initiate a debug session to debug a targeted thread of the one or more threads, wherein the request identifies the target device and the targeted thread;
in response to receiving the request, determine that an independently deployable module for the lightweight debug agent usable in performing the debug session is not deployed at the virtual machine;
in response to said determining that the module is not deployed, deploy the module of the lightweight debug agent at the virtual machine for the debug session;

initiate the debug session of the targeted thread, wherein the debugging session comprises pausing execution of the targeted thread at a given point; and receive, from the lightweight debug agent, debug information obtained from the targeted thread of execution during at least a portion of the debug session; provide the debug information to a debugger.

2. The system as recited in claim 1, wherein the debug controller is further configured to:

in response to determining that said debug session has terminated, initiate an undeployment of the module from the virtual machine.

3. The system as recited in claim 1, wherein the debug information obtained from the targeted thread of execution is in a format that is not recognizable by the debugger, and wherein the debug controller is further configured to:

prior to transmitting said debug information to the debugger, translate said debug information into a format recognizable by the debugger.

4. The system as recited in claim 1, wherein, in said translating, the debugger is further configured to:

generate a representation of the debug information formatted in accordance with a standard debug information protocol specification utilizing an intermediate version of a program corresponding to the targeted thread of execution, wherein the intermediate version is generated during a derivation of an executable version of the program from a source code version of the program.

5. The system as recited in claim 1, wherein the module is deployed to the virtual machine after the targeted thread of execution starts executing.

6. The system as recited in claim 1, wherein the virtual machine comprises a plurality of isolates, wherein each isolate of the plurality of isolates comprises one or more threads of execution with an address space that is not directly accessible from any other isolate of the plurality of isolates, wherein the targeted thread of execution is executed within a first isolate of the plurality of isolates, and wherein the lightweight debug agent is executed within a second isolate of the plurality of isolates.

7. The system as recited in claim 1, wherein the module includes:

a communication driver module configured to provide an interface to a hardware or wireless communication link coupling the lightweight debug agent to the debug controller; or a transport module configured to format the debug information for transmission from the virtual machine to a corresponding module within the debug controller in accordance with a debug transport protocol; or a debugging interfaces module configured to provide a plurality of interfaces through which the debug information is obtained from the targeted thread of execution.

8. The system as recited in claim 1, wherein the module comprises a communication driver module configured to support communication between the target device and the debug controller over a respective type of communication link, wherein the debug controller is further configured to:

select the module from among a plurality of communication driver modules, each usable for communicating debug information during the debug session.

9. The system as recited in claim 8, wherein at least one communication driver module of the plurality of communication driver modules is configurable for use by a plurality of threads of execution at the virtual machine including the targeted thread of execution, wherein said selecting the module comprises:

identifying one communication driver module of the plurality of communication driver modules that is in use by the targeted thread of execution; and selecting an other communication driver module of the plurality of communication modules as the particular communication driver module.

10. A computer-implemented method, comprising:

performing by a computer:

receiving an identification of a thread of execution to be targeted for debugging during a debug session, wherein the thread of execution is executing within a virtual machine;

selecting, from among a plurality of independently deployable modules for a lightweight debug agent, one or more modules to be deployed to the virtual machine to obtain debug information from the targeted thread during the debug session;

deploying the one or more modules to the virtual machine for the debug session;

obtaining debug information from the targeted thread during the debug session using the lightweight debug agent, wherein the debug agent is capable of pausing execution of the targeted thread at a given point during the debug session; provide the debug information to a debugger.

11. The method as recited in claim 10, further comprising:

in response to determining that the debug session has terminated, undeploying at least one module of the lightweight debug agent from the virtual machine.

12. The method as recited in claim 10, further comprising:

translating the debug information obtained from the targeted thread into a standard format recognizable by a debugger.

13. The method as recited in claim 10, wherein the plurality of independently deployable modules comprises a plurality of communication driver modules, wherein each communication driver module of the plurality of communication driver modules is configured to support communication over a respective type of communication link, further comprising:

selecting, from among the plurality of communication driver modules, a particular communication driver module to be used for communicating debug information during the debug session;

determining whether the particular communication driver is already deployed at the virtual machine;

in response to determining that the particular communication driver is not already deployed, deploying the particular communication driver to the virtual machine for the debug session.

14. A tangible computer readable storage medium storing program instructions, wherein the instructions are computer-executable to:

receive an identification of a thread of execution to be targeted for debugging during a debug session, wherein the thread of execution is executing within a virtual machine;

select, from among a plurality of independently deployable modules for a lightweight debug agent, one or more modules to be deployed to the virtual machine to obtain debug information from the targeted thread during the debug session;

deploy the one or more modules to the virtual machine for the debug session; and obtain debug information from the targeted thread during the debug session using the lightweight debug agent, wherein the debug agent is capable of pausing execution of the targeted thread at a given point during the debug session; provide the debug information to a debugger.

15. The computer readable storage medium as recited in claim 14, wherein the instructions are further computer-executable to:
undeploy at least one module of the lightweight debug agent from the virtual machine in response to determining that the debug session has terminated.

16. The computer readable storage medium as recited in claim 15, wherein the plurality of independently deployable modules comprises a plurality of communication driver modules, wherein each communication driver module of the plurality of communication driver modules is configured to support communication over a respective type of communication link, wherein the instructions are further computer-executable to:
select, from among the plurality of communication driver modules, a particular communication driver module to be used for communicating debug information during the debug session;
determine whether the particular communication driver is already deployed at the virtual machine; and
in response to determining that the particular communication driver is not already deployed, deploy the particular communication driver to the virtual machine for the debug session.

17. A constrained-memory computing device, comprising:
a processor,
a memory coupled to the processor, wherein the memory comprises program instructions executable by the processor to:
implement a plurality of threads of execution within a virtual machine, wherein the virtual machine is a reduced-memory version of a standard virtual machine used for deploying applications written in a platform-independent programming language;
receive, from a debug controller via a communication link, one or more executable modules of a plurality of independently deployable modules for a lightweight debug agent to be deployed at the virtual machine to obtain debug information from a targeted thread of the plurality of threads during a debug session, wherein the targeted thread is identified by the debug controller and wherein the lightweight debug agent is capable of pausing execution of the targeted thread at a given point during the debug session;
deploy the one or more executable modules at the virtual machine for the debug session while the targeted thread is running; and
transmit, to the debug controller via the communication link, debug information obtained from the targeted thread by the lightweight debug agent during the debug session.

18. The device as recited in claim 17, wherein the memory comprises random access memory (RAM), wherein no more than 64 kilobytes of RAM are included in the memory.

19. The device as recited in claim 17, further comprising a wireless micro-electro-mechanical sensor (MEMS), wherein the virtual machine comprises a small programmable object technology (SPOT) implementation, and wherein the memory does not include an operating system.

* * * * *

UNITED STATES PATENT AND TRADEMARK OFFICE
CERTIFICATE OF CORRECTION

PATENT NO.        : 7,669,186 B2
APPLICATION NO. : 11/281708
DATED             : February 23, 2010
INVENTOR(S)       : Nolan et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1132 days.

Signed and Sealed this

Seventh Day of December, 2010

David J. Kappos
*Director of the United States Patent and Trademark Office*